July 16, 1929.  A. FORNEY  1,721,441
SELECTIVE VENDING AND CHANGE MAKING MACHINE
Filed Nov. 16, 1927  9 Sheets-Sheet 3

Fig. 3.

Inventor
Arthur Forney.

Attorney

July 16, 1929. A. FORNEY 1,721,441

SELECTIVE VENDING AND CHANGE MAKING MACHINE

Filed Nov. 16, 1927 9 Sheets-Sheet 8

Inventor
Arthur Forney.

By L. L. Morrill
Attorney

Fig. 19.

Patented July 16, 1929.

1,721,441

UNITED STATES PATENT OFFICE.

ARTHUR FORNEY, OF BALTIMORE, MARYLAND.

SELECTIVE VENDING AND CHANGE-MAKING MACHINE.

Application filed November 16, 1927. Serial No. 233,616.

This invention relates to selective vending and change making machines and has for an object to provide a machine adapted to vend, the package selected by the operator from any one of a plurality of packages and to return to the operator change from a coin of higher denomination than the cost price of the package when such higher value coin is employed.

A further object of the invention is to provide an improved type of vending machine having coin receiving slots with selective adjustments whereby the device may be set for vending commodities of different cost price.

A further object of the invention is to provide a vending machine of improved type adapted to deliver to the operator a package upon the introduction of the necessary cost in coin and upon the manipulation by the operator of manual means for selecting from a plurality of varied commodities the particular commodity sought to be purchased.

A further object of the invention is to provide improved means for facilitating the making of change and for withdrawal from the device of surplus coins other than those retained in the apparatus for the purpose of completing the change.

A further object of the invention is to provide a machine of the class by the use of which a package of commodity exhibited for vending may be projected by the use of a single coin or a plurality of coins of lesser denomination, totaling or exceeding the cost price of the commodity.

A further object of the invention is to provide improved means and mechanisms for carrying out the several objects heretofore recited.

With these and other objects in view, the invention comprises certain novel parts, elements, units, combinations, constructions, interactions, mechanical and electrical units and combinations performing mechanical and electrical functions as will be hereinafter more fully described and claimed.

In the drawings.

Like characters of reference indicate corresponding parts throughout the several views.

Figure 1:
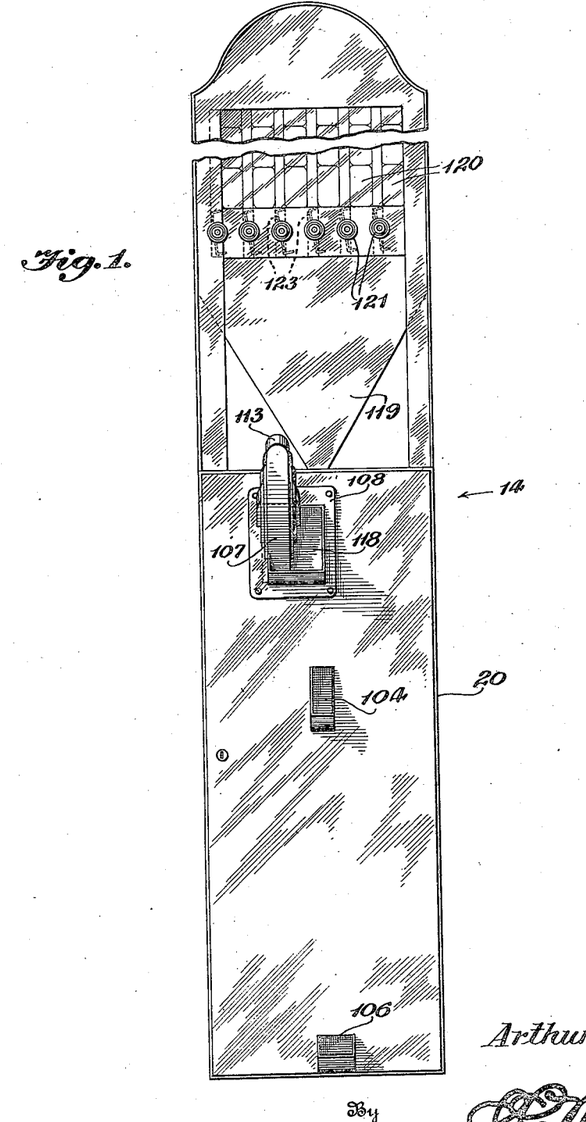
Figure 1 is a view of the device in front elevation.

The improved selective vending and change making machine which forms the subject matter of this application comprises a housing 20 of any approved material, shape, size and type and the showing of the housing at Figure 1 is merely a convenient and desirable form and is not in any way a restriction or limitation upon the invention.

Figure 4:
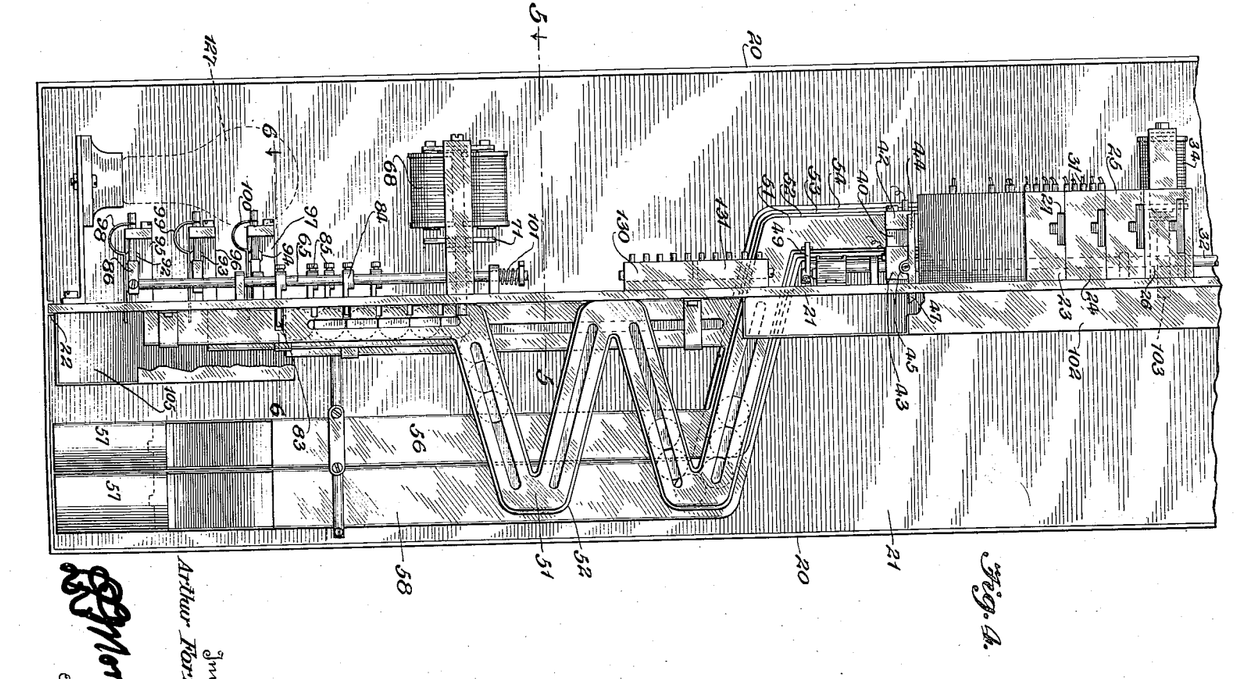
Figure 4 is a view of the device in front elevation with the housing removed.
Figure 5:
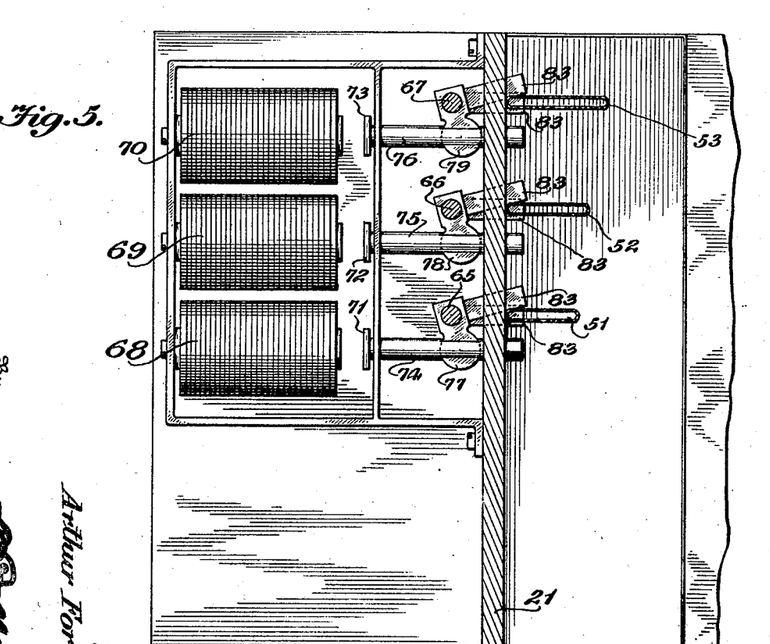
Figure 5 is a detail horizontal sectional view taken on line 5—5 of Figure 4.

Within the housing a vertical partition 21 is erected and as the device is provided with electrical installation it is desirable that this partition shall be composed of some insulating material, but the use of an insulating material for the purpose is not made any limitation upon the invention. Also preferably, though not essential to the invention, the partition or instrument board 21 is made removable bodily from the housing by means of being slidably inserted into a guideway 22, as shown at Figure 4, and all of the actuating or operating parts are attached to this partition and, therefore, removable from the housing for construction, adjustment, repair or the like.

There is attached to one side of the partition 21 a plurality of coin guideways 23, 24, 25 and 26. For purpose of illustration only, four of these contact slots have been shown and also merely for the purpose of illustration it will be assumed that they are respectively for the receipt of coins of the value of five cents, twenty-five cents, fifty cents and a dollar It will be understood, however, that the device is capable of construction for the employment of coins of any denomination and that the indication of coins of these several denominations are merely for the purpose of illustration as well as the number of such contact chutes employed which may be increased or decreased as the exigencies of use may make necessary or desirable.

Each of the chutes comprises a slot which for brevity will be indicated by the same numeral in each of the units as 27, properly proportioned to receive the coin designed for use in that particular unit with an underlying furrow 28 so that the coin is supported upon the shoulders of the chute 27 above the furrow 28. Within each of the several furrows 28 are located a plurality of coin contacts. These coin contacts may be of any approved type so that they shall be in position to engage one or more of the coins in the chute. At Figure 10 a contact is shown comprising a spring 29 which is located in the furrow 28 and extends slightly above the top of the shoulder and into the slot 27. Each of these contacts 29, which are all similar, is provided with a connector 30 which extends outwardly from the side of the several chutes and is adapted to receive one of the several terminals 31 with which the various wires forming part of the electrical installation are provided.

These several terminals 31 are manually removable and replaceable in or into any of the several contact members 30 which are used similarly throughout the construction.

Adjacent to the lower normally open ends of the several coin slots 27 is mounted a vertical shaft 32 carrying a plurality of fingers 33 closing the lower discharge ends of the coin slots and preventing the discharge of a coin from such slots into the chute to be hereinafter more fully described.

Mounted upon the partition 21 also is an electromagnet 34 with an armature 35 carried upon a sliding guide member 36 having a slot engaging the crank arm 37 upon the shaft 32, so that, when the magnet 34 is energized, the armature is attracted and oscillates the shaft 32. The shaft 32 also carries a finger 38 properly positioned to engage the spring contact 39 carried by the bracket 40. This bracket 40 is rigidly secured to the partition 21 and accommodates an adjustable contact member 41 electrically connected with a plate 42. A second plate 43 is carried upon this insulating bracket 40 and proper electrical connections are made with the contact 41 and plate 43 as will be hereinafter more fully described and claimed. A blade 44 is electrically connected with the plate 43 by being pivoted thereto, as indicated at 45 and is provided with a weighted head 46 which engages upon the plate 42 by gravity with the opposite end constructed as a lever at 47 inserted through the partition 21 and into the commodity slot as will be hereinafter more fully described and claimed. Incidentally, but forming no essential part of the invention, a cumulative register 48 is mounted upon the partition 21 and is connected through a link 49 with the crank arm 50 upon the shaft 32.

At the discharge or lower ends of the several coin slots 27 are arranged a plurality of coin chutes 51, 52, 53 and 54, which in the arrangement indicated are adapted respectively to receive coins of five, twenty-five, fifty and a dollar value. These several coin chutes 51, 52, 53 and 54 are inclined first downwardly corresponding substantially with the inclination of the coin slots 27, after which they severally make elbow turns and pass through the partition 21 as indicated more particularly at Figure 4. The chutes 51 and 52, which are designed respectively for accommodating coins of five cent and twenty-five cent values, are substantially identical and are constructed with slots to exhibit from the outside or otherwise the coin contained therein for the purpose of preventing or discouraging the use of unauthorized checks for operating the device. The chute 53, designed in the particular type indicated for coins of half dollar value, is, however, preferably differently constructed, having a vertical leg 55 (see Fig. 11), also slotted with an overflow 56 with coin receptacle beneath, indicated in dotted lines at 57, and to be hereinafter more fully described.

The chute 54, designed for the receipt of coins of one dollar value, continues in a vertical leg 58 to a similar coin receptacle.

Figures 11, 12, 13, 20:
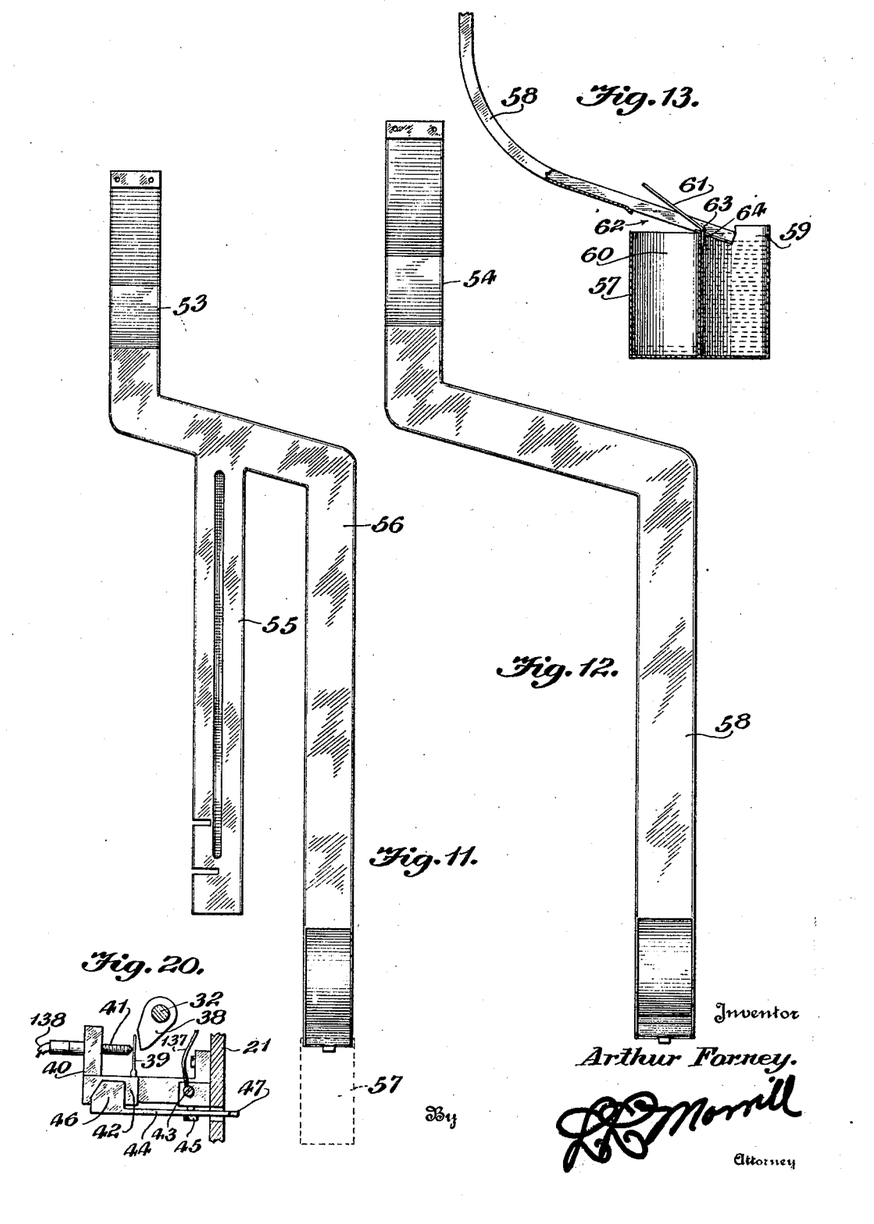
Figure 11 is a view in side elevation of one of the coin storage and change making stacks.
Figure 12 is a view in side elevation of a coin chute for accommodating the coins of larger denomination which are not employed for change.
Figure 13 is a view of the lower terminal of the coin devices shown at Figures 11 and 12, showing the receptacle employed in combination with such mechanisms for receiving and computing the coins contained.
Figure 20 is a detail sectional view on line 20—20 of Figure 3.

This coin receptacle disposed beneath the vertical legs 56 and 58 preferably comprises a member having two adjacent compartments 59 and 60 (see Fig. 13). The lower end, or discharge from either the leg 56 or 58, is introduced into the compartment 59 and is provided with a trap. The trap comprises a plate 61 covering an opening 52 through the bottom of the chute and adapted, when closed, to cause the coin to slide over the trap into the compartment 59. The plate 61 is fulcrumed at 63 and is provided with a finger 64 so positioned that, as each coin is introduced into the compartment 59, the trap 61 is raised upon its fulcrum when, as the coin goes downwardly into the compartment, the finger 64 is released and the trap again closes. When, however, the compartment 59 has been filled with coins, the last coin in the compartment maintains the trap with the plate 61 raised as indicated at Figure 13 so that subsequent coins are discharged into the compartment 60. These compartments are designed to contain a predetermined number of coins so that computation is facilitated without counting.

The several coin chutes 51, 52 and 53 are employed as part of the change making apparatus.

The change making apparatus comprises shafts 65, 66 and 67 journaled vertically upon the partition 21 and accompanied respectively by electromagnets 68, 69 and 70. The several electromagnets are respectively provided with armatures 71, 72 and 73, which, by means of sliding guides 74, 75 and 76, properly slotted, engage crank arms 77, 78 and 79 upon the shafts 65, 66 and 67.

Adjacent the shaft 65, the partition 21 is provided with a plurality of slots 80, similar slots differently positioned being adjacent the shaft 66, while other similar slots but differently spaced indicated at 82, are adjacent the shaft 67. The several shafts 65, 66 and 67 are provided each with a plurality of similar detents 83 which are adjustable upon the shafts by means of preferably integral sleeves 84 and set screws 85 to be extended through the several elected slots adjacent to their particular shafts and extending upon the opposite side of the partition 21 across a part of the several coin chutes 51, 52, 53.

Figure 6:
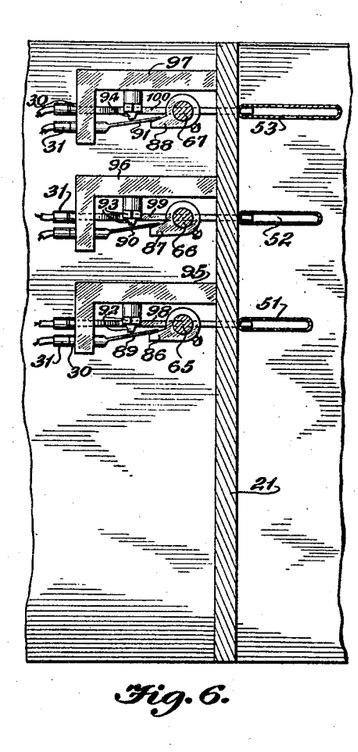
Figure 6 is a horizontal detail sectional view taken on line 6—6 of Figure 4.
Figure 7:
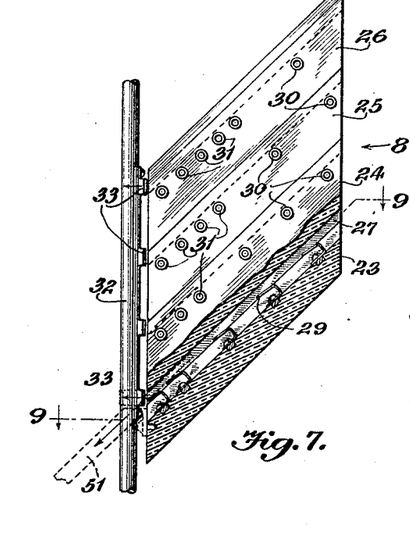
Figure 7 is an enlarged detail view partly in side elevation and partly in broken vertical section of the coin-circuit closing mechanisms.

The shafts 65, 66 and 67 also carry fingers 86, 87 and 88 positioned respectively to engage against spring contact members 89, 90 and 91 and to force said spring contacts into electrical engagement with fixed contacts 92, 93 and 94, which are carried respectively upon brackets 95, 96 and 97 rigidly secured to the partition 21. The spring contacts 89, 90 and 91 are provided with the socket and pin contacts 30 and 31 heretofore described, whereas the fixed contacts 92, 93 and 94 are respectively engaged by springs 98, 99 and 100 which are similarly provided with the socket and pin contacts 30, 31 and extend through slots in the partition 21 under the coin chutes 51, 52 and 53 as indicated more particularly at Figure 6.

The several magnetically oscillated shafts 32, 65, 66 and 67 are provided with similar springs 101 to return the parts to normal position when the magnets are deenergized.

Figure 2:
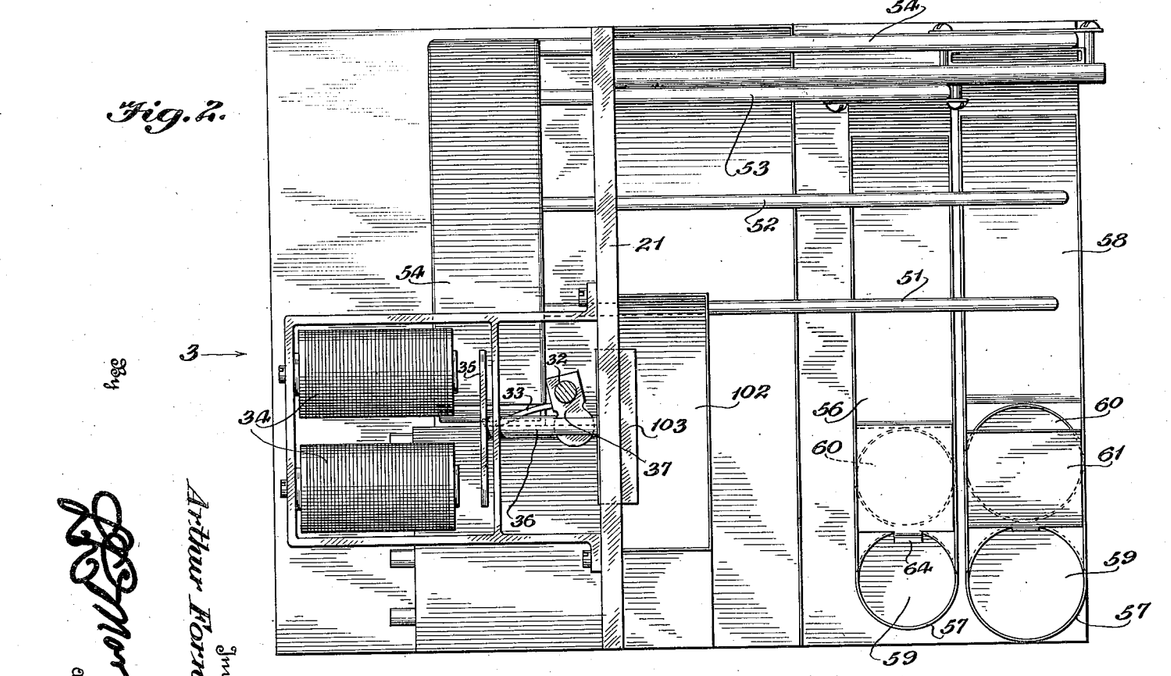
Figure 2 is a top plan view of the device with the housing omitted.

The device is provided with a commodity chute 102 and the sliding guide 36 of the armature 35 is provided with a detent 103 which extends through the partition 21 and into the commodity chute as indicated more particularly at Figures 2 and 4, in such position as to support one or more packages of commodity above and resting upon the detent 103 to be discharged when and only when the detent is withdrawn by the energizing of the magnet 34, such package in its descent engaging against the finger 47 for breaking the circuit as will be hereinafter more fully described and claimed, such commodity chutes terminating at an opening 104 at the front of the device, as shown at Figure 1, and through and from which the commodity may be manually extracted.

Located also below the lower terminals of the several coin chutes 51, 52 and 53 is an inclined member 105 forming part of or communicating with the receptacle 106 at the front of the machine from and through which the change returned may be manually extracted.

Figure 8:
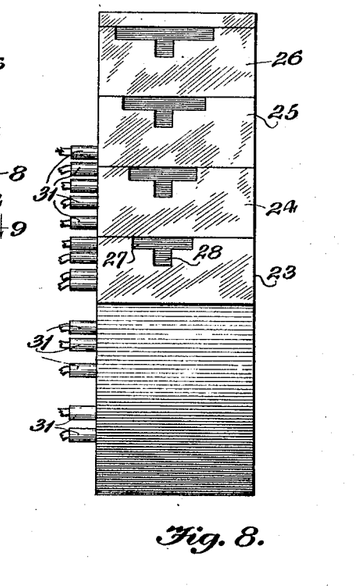
Figure 8 is a view of the coin circuit closing mechanisms, seen in front elevation, as indicated by arrow 8 at Figures 3 and 7.
Figure 14:
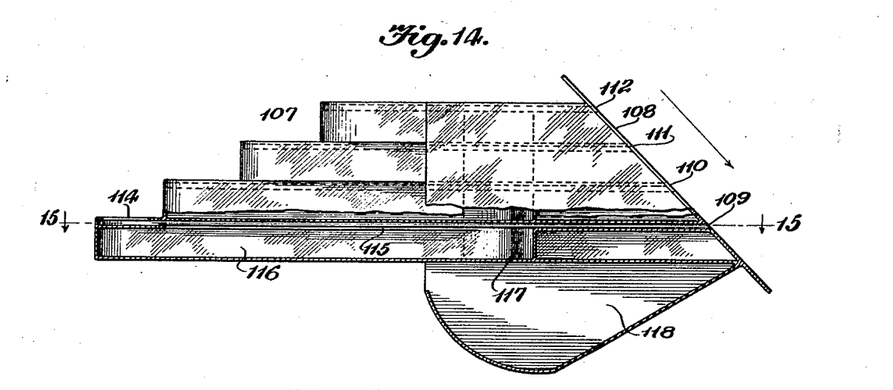
Figure 14 is a view partly in side elevation and partly in section of the initial coin chute placed upon the front of the machine, such chute being indicated by the arrow 14 at Figure 1.
Figure 15:
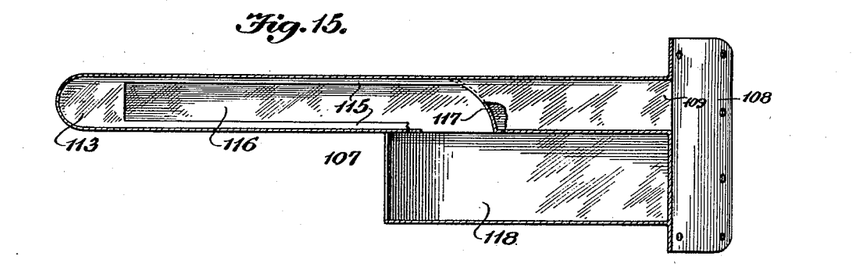
Figure 15 is a sectional view taken on a plane coinciding with the inclination of the initial coin chute and on the line 15—15 of Figure 14.

Upon the front of the machine and communicating with the several coin slots 27 is an initial coin introducing device, indicated as an entirety at 107, and shown in detail at Figures 14 and 15. This device comprises a plate 108 which is secured to the front of the machine in such position that the several slots 109, 110, 111 and 112 communicate with the respective coin slots 27 within the housing. Device 107 is attached to the housing in such manner as to assume an inclination, and for the purpose of more readily understanding the device an arrow has been placed to the right at Figure 8 to indicate a vertical. All of the several coin chutes are similar and a description of one, it is believed, will be ample for the purpose. It comprises an extended end 113 having an opening 114 of the proper dimension to receive the coin elected to be introduced into said chute and is provided with ribs 115 overhanging the discharge chute 116 which, by the employment of a curved partition 117, is adapted to discharge an unauthorized coin or slug into the receptacle 118, the coin of the correct denomination being prevented from discharge by the shoulders 115 and conducted to the opening of the proper chute 27.

Figure 16:
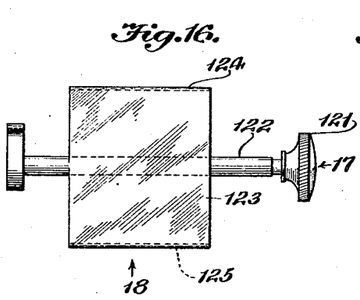
Figure 16 is a view in side elevation of one of the manual selectors by the manipulation of which a package of the elected variety is vended.
Figure 17:
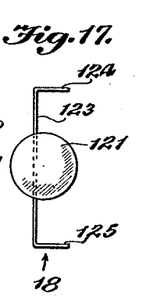
Figure 17 is a view of the selector in end elevation as indicated by arrow 17 at Figure 16.
Figure 18:
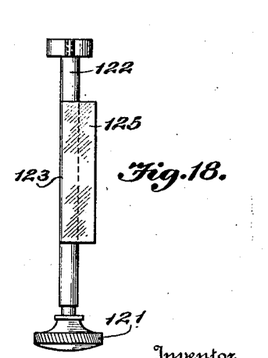
Figure 18 is a view of the selector in edge elevation as indicated at arrows 18 at Figures 16 and 17.

Above the top of the commodity chute 102 is a hopper 119, the lower or converging end communicating with the commodity chute and above its upper or diverging end are positioned a plurality of stacks of commodities indicated at 120 (see Fig. 1). Each of the stacks 120 is provided with a manual selector and discharge comprising a knurled or otherwise easily operated head 121 which extends outwardly carried upon a shaft 122 (see Figs. 16 to 18 inclusive), which said shaft is properly journaled and carries an escapement comprising a, plate 123 with flanges 124 and 125 respectively. The flanges 124 and 125 are properly spaced to co-act with the particular packages of commodity being vended so that the manual actuation of any one of the several selectors will drop from the stack one package of the commodity. No attempt has been made to show any locking means for these devices for, while it would be possible to manipulate one of these devices to discharge the entire number of packages in the stack or to actuate several, it would only be possible to discharge through the commodity chute and, therefore, deliver to the customer a single package without the introduction of further coins so that, while such a locking means might be desirable, it is not essential to the actuation of the device.

Figure 19:
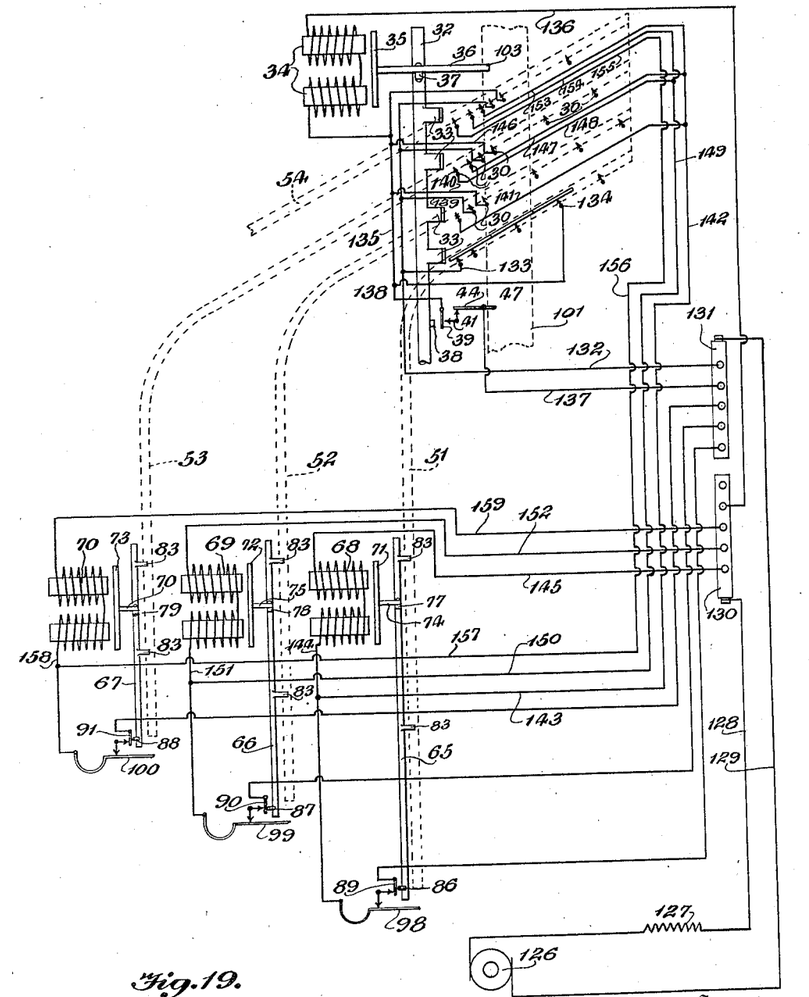
Figure 19 is a diagrammatic view of the electric installation.

As has been indicated by numerous references, contacts, connections and the like, the device is electrically operated and for that purpose will take its power from any convenient source, as indicated at 126 (see Fig. 19) and a resistance 127 employed to properly reduce the voltage to safety. The lines 128 and 129 connect respectively with blocks 130 and 131 carrying a plurality of binding posts in electrical connection with the lines from which electrical current of the proper voltage reduced by the resistance is employed for the several purposes hereinafter mentioned.

As shown in the diagram, the pin connectors 31 are associated with the coin contact member 23 to accommodate three coins as indicated. Current is, therefore, taken from the block 131 through the line 132 to that particular sleeve and pin contact indicated at 133, then passing through the three coins as indicated to the pin and sleeve contact indicated at 134, then through the line 135 to the magnet 34, through the line 136 to the block 130, energizing the magnet 34, attracting the armature 35 and oscillating the shaft 32. The oscillation of the shaft 32 removes the finger 33 from the coin slot and at the same time by means of the device shown at Figure 20 actuates the finger 38 to move the spring contact 39 into engagement with the adjustable contact 41. Current is then taken from the block 131 through the line 137 to the plate 42, through the switch arm 44 and head 46 to the plate 42, through the spring contact 39 and adjustable contact 41 to the line 138, line 135 to the magnet returning through the line 136 to the block 130, maintaining the magnet in energized condition. The energizing of the magnet attracts the armature 35, withdrawing the finger 103 from the commodity chute and the closing of the circuit at 39, 41 maintains the commodity chute open until a commodity package has passed therethrough into engagement with the finger 47, lifting the weighted head 46 and breaking the circuit, whereupon the armature and all parts are returned to normal position by the spring 101. This arrangement is assumed for the vending of a package selling for fifteen cents, therefore requiring three coins of five cent denomination to actuate the machine. It is obvious that the point 134 may be varied to any of the sleeves 30 whereby the number of coins employed for this purpose may be in accordance with the selling price of the article.

Still assuming the selling price of the article at fifteen cents and that a coin of twenty-five cents is introduced at the guideway 24, it will make contact with the three contact members 29. Current now passes from the block 131 through the line 132, 139 across the coin to the line 140 to the line 135 and magnet 34, through the line 136 to the block 130 as hereinbefore described. At the same time current from the block 131 through the line 132 and 139 will pass across the coin to the line 141 through the lines 142, 143, 144 to the magnet 68 and through the line 145 to the block 130. This will energize the magnet 68, oscillating the shaft 65.

Figure 3:
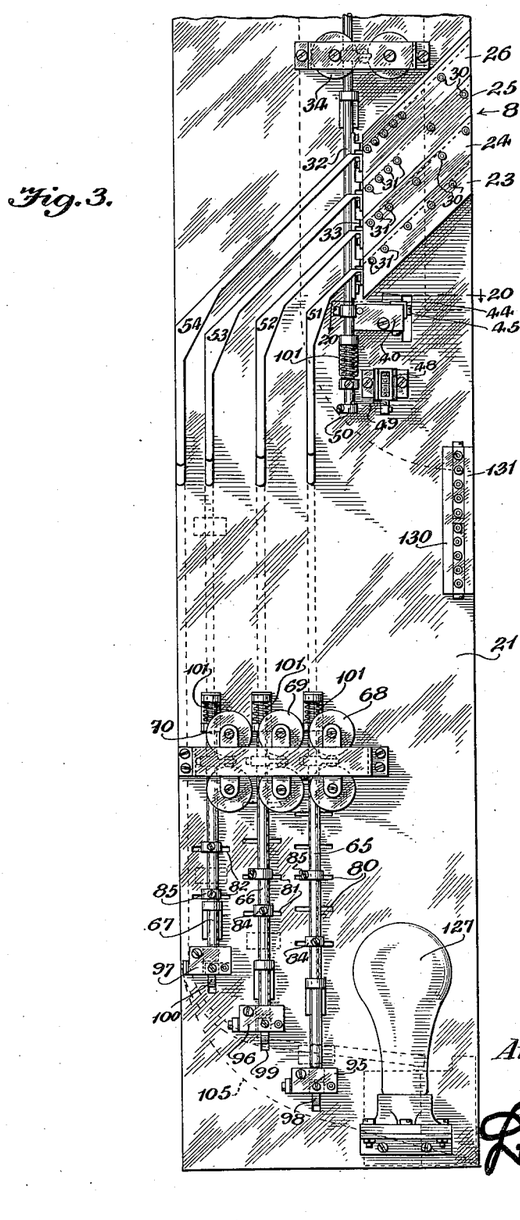
Figure 3 is a side view of the mechanism with the housing omitted, seen from the side indicated by arrow 3 at Figure 2.

As will be seen especially from Figures 3 and 4, the shaft 65 carries fingers 83 so positioned as to deliver two coins from the coin chute 51 which contains coins of five cent value. These coins are discharged into the receptacle 105 and may be removed by the operator together with the commodity package discharged into the outlet 104, so that by the introduction of a coin of twenty-five cent value, the operator receives his package of commodity and two coins of five cent value.

In case a coin of fifty cent value is introduced into the chute 25, it makes contact for actuating the magnet 34, as hereinbefore described, also current passes from the line 146 to the two lines 147 and 148. The line 147 connects with the line 142 and actuates the magnet 68 as hereinbefore described for discharging two coins of five cent value, whereas the line 148 connects with the lines 149 and 150 through the line 151 with the magnet 69, through the line 152 to the block 130, energizing the magnet 69, attracting the armature 72, oscillating the shaft 66 and, as indicated at Figure 3, and the position of the fingers 83 shown therein, discharging one coin so that one coin of twenty-five cent value and two coins of five cent value are discharged into the receptacle 106.

Figures 9, 10:
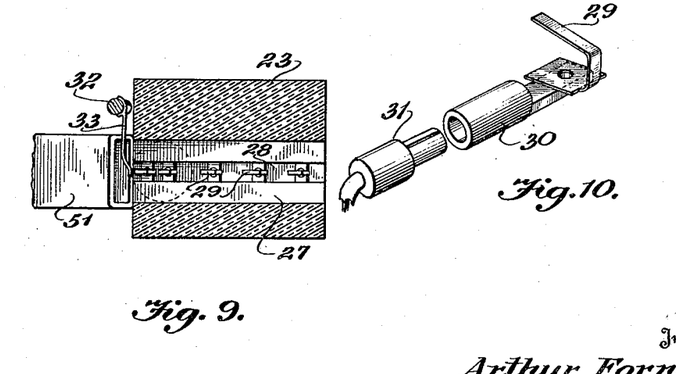
Figure 9 is a detail sectional view taken on a line corresponding to the inclination of the coin circuit mechanism and as indicated by lines 9—9 at Figure 7.
Figure 10 is a detail perspective view of one of the coin contacts.

In case a coin of the value of one dollar is introduced into the coin contact member 26, it makes contact with five contact members 29, as indicated at Figure 10, energizing the magnet 34, as heretofore described for the discharge of the commodity, also through the line 153 to the line 144, energizing the magnet 68, through the line 154 to the line 149, energizing the magnet 69, and through the lines 155, 156, 157 and 158 to the magnet 70, returning through the line 159 to the block 130. The energizing of this magnet 70 attracts the armature 73 and oscillates the shaft 67 and in accordance with the arrangement shown at Figure 3 discharging one coin of fifty cent value, so that there is discharged a commodity package, two coins of five cent value, one coin of twenty-five cent value and one coin of fifty cent value, which coins may be removed from the receptacle 106 while the commodity is likewise removed from the receptacle 104.

In each instance when the shafts 65, 66 or 67 are oscillated as described, the fingers 86, 87 or 88 will respectively operate their spring contacts 89, 90 or 91, one or all of said contacts to close the circuits to their respective magnets 68, 69 or 70 so that the fingers 83 actuated by the energizing of the magnets will remain in discharging position sufficiently long for the proper discharge of the necessary coins from the chute, which coins, when being discharged from the chute, will engage against some or any of the fingers 98, 99 or 100 to break the contact and de-energize the magnets, said movable parts then being returned to normal or inoperative position by the spring 101. The spring contacts 98, 99 and 100 will be placed sufficiently far below the lowermost finger 83 so that the requisite number of coins may be discharged before the contact is broken and, in the meanwhile, the stack of coins contained in some or all of the respective chutes before the closed fingers 83 are retained against discharge by the closed finger 83 which remains in that position until the magnet is deenergized and the shafts oscillated in opposite directions by their respective springs 101.

The description of the operation as vending an article of fifteen cents value has been only for convenience and it is obvious that an article of greater or less value may be vended by adjustments of the several parts. For instance, the line 134 may be set up or down for five cents to twenty cents. Line 140 may likewise be set up or down to make contact with two, three or four coins of twenty-five cents value, also the line 146 set up to operate with two or three coins of fifty cents value, and the line for the coins of one dollar likewise manipulated.

Under these conditions, the fingers 83 are adjusted to operate in others of the slots 80, 81 or 82 (see Fig. 3). The adjustment of these fingers up or down their respective shafts 65, 66 and 67 will be readily understood.

What I claim to be new is:

1. A selective vending and change making machine comprising a commodity chute, a plurality of coin chutes, detents for closing all of said chutes, an electro-magnet, means actuated by the electro-magnet for releasing all of said closures, a plurality of contacts arranged in each of said coin chutes properly spaced to make contact with the elected coin, a plurality of connectors in circuit with the source of energy and the magnet and one adjustably connected with either of the contacts of each of the chutes, other detents located in one of the coin chutes, an electro-magnet adapted to remove the last mentioned detents, and a normally open circuit for said last mentioned electro-magnet, said circuit being closed by the contact of the elected coins in the appropriate coin chutes.

2. A selective vending and change making machine comprising a commodity chute, a plurality of coin chutes, closures for the chutes, an electro-magnet adapted, when energized, to withdraw the closures from the chutes, a source of electrical energy in circuit with the magnet, a plurality of contacts in each of said coin chutes properly spaced to make contact with a predetermined number of coins in said chute, connectors in circuit with the source of energy and magnet and electively adjustable relative to said contacts of said coin chutes, other detents closing some of said coin chutes and adjustable relative to the extent of said chutes, an electro-magnet for each of said last mentioned detent organizations, and a circuit including one of said magnets and one of said coin chutes whereby the introduction of the elected number of coins into said coin chutes energizes said last mentioned magnets.

3. A selective vending and change making machine comprising a commodity chute, a coin chute, means for closing the commodity chute and the coin chute, a moving part adapted to withdraw said closures, an electro-magnet for actuating said moving part, a source of electrical energy in circuit with the electro-magnet, a plurality of contacts in said coin chute, a connector in circuit with the source of energy and the magnet and adjustably connectible with any of said several contacts, a second circuit from said electro-magnet, a switch located in said second circuit, means actuated by said moving part for closing said switch, and means actuated by the passage of a commodity package for opening said switch.

4. A selective vending and change making machine comprising a commodity chute and a plurality of coin chutes, closures for the chutes, a moving part for actuating said closures, an electro-magnet adapted to actuate said moving part, a source of energy in contact with said electro-magnet, connectors in circuit with said source of energy and said magnet, connectible with said coin chutes to make contact with an elected number of coins in said chute, other detents adjustably closing the coin chutes, moving parts for said last mentioned detents, electro-magnets for actuating said last mentioned moving parts, circuits for said electro-magnets including contacts in said coin chutes, other circuits for said electro-magnets including normally open switches, means carried by said last mentioned moving parts for closing said last mentioned switches, and means whereby the passage of coins through said chutes opens said switches.

In testimony whereof I affix my signature

ARTHUR FORNEY.